UNITED STATES PATENT OFFICE.

EDMOND GAUVREAU, OF QUEBEC, CANADA.

IMPROVEMENT IN MEDICAL COMPOUNDS OR COUGH-LOZENGES.

Specification forming part of Letters Patent No. 129,942, dated July 30, 1872.

Specification describing a new and useful Improvement in Medical Lozenge, invented by Dr. EDMOND GAUVREAU, of Quebec, in the Dominion of Canada.

This invention or discovery relates to a new and useful compound, in the form of lozenges, for the cure of coughs, colds, and affections of the throat and lungs, and all diseases of the respiratory organs; and consists in the ingredients hereinafter named, combined in about the proportions specified and in the form described.

In carrying out my invention I take two parts of pul. ipec. et opii, sixty-four parts saccharum, one part citric acid, (solution,) two parts alcohol, one part sirup of pine-apple; tragacanth sufficient for coloring. These ingredients are mixed together to form a solid mass of paste, which is then cut into lozenges, which dry hard, and are then put up in boxes for use.

These lozenges are intended to affect the system in a similar manner to the "Dover powders;" and by combining the main ingredients of the Dover powder with the other well-known substances, and forming lozenges thereof, as described, the medicine is put in a more attractive and convenient form, and is a most efficacious remedy for coughs, colds, and all affections of the throat and lungs.

Having thus described my invention, I claim as new and desire to secure by Letters Patent—

The above-described lozenge, substantially as and for the purposes specified.

DR. EDMOND GAUVREAU, M. L. L.

Witnesses:
   G. AMYOT,
   GEO. THEO. TREMBLAY, N. V.